US012212072B2

(12) United States Patent
Lin et al.

(10) Patent No.: US 12,212,072 B2
(45) Date of Patent: Jan. 28, 2025

(54) ANTENNA SYSTEM

(71) Applicants: Inventec (Pudong) Technology Corporation, Shanghai (CN); INVENTEC CORPORATION, Taipei (TW)

(72) Inventors: Hsin Hung Lin, Taipei (TW); Yu Shu Tai, Taipei (TW); Wei Chen Cheng, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 141 days.

(21) Appl. No.: 18/067,739

(22) Filed: Dec. 19, 2022

(65) Prior Publication Data

US 2024/0097351 A1 Mar. 21, 2024

(30) Foreign Application Priority Data

Sep. 15, 2022 (CN) ........................ 202211124155.7

(51) Int. Cl.
*H01Q 21/28* (2006.01)
*H01Q 9/30* (2006.01)

(52) U.S. Cl.
CPC ............... *H01Q 21/28* (2013.01); *H01Q 9/30* (2013.01)

(58) Field of Classification Search
USPC .......................................................... 343/702
See application file for complete search history.

(56) References Cited

U.S. PATENT DOCUMENTS

| | | | | |
|---|---|---|---|---|
| 8,570,114 B2 * | 10/2013 | Wu | H05K 9/0039 343/909 |
| 2017/0141465 A1 * | 5/2017 | Sharawi | H01Q 1/521 |
| 2019/0165476 A1 * | 5/2019 | Hong | H01Q 21/065 |
| 2021/0210855 A1 * | 7/2021 | Yue | H01Q 13/02 |

OTHER PUBLICATIONS

Da Qing Liu et al., "An Extremely Low-Profile Wideband MIMO Antenna for 5G Smart-phones." IEEE Transactions on Antennas and Propagation, vol. 67, No. 9, 2019, pp. 5772-5780.

* cited by examiner

*Primary Examiner* — Hoang V Nguyen
*Assistant Examiner* — Brandon Sean Woods
(74) *Attorney, Agent, or Firm* — CKC & Partners Co., LLC

(57) ABSTRACT

The present disclosure provides an antenna system, which includes a defected ground structure board and an antenna structure board. The defected ground structure board includes a first insulating plate and a defected ground structure layer, and the defected ground structure layer is disposed on the first insulating plate. The antenna structure board is disposed on the defected ground structure board. The antenna structure board includes at least one antenna body and a second insulating plate, the at least one antenna body is disposed on the second insulating plate, and the second insulating plate is disposed on the defected ground structure layer.

18 Claims, 9 Drawing Sheets

130

ANTENNA SYSTEM

CROSS-REFERENCE TO RELATED APPLICATION

This application claims priority to China Application Serial Number 202211124155.7, filed Sep. 15, 2022, which is herein incorporated by reference.

BACKGROUND

Field of Invention

The present invention relates to systems, and more particularly, an antenna system.

Description of Related Art

Physically, an antenna is a combination of one or more conductors. In use, the antenna is the interface between radio waves propagating through space and electric currents moving in metal conductors.

For many years, the antenna design of consumer electronic products has relied heavily on the physical machine environment for antenna adjustment, and the design process is cumbersome and complicated, which is time-consuming and expensive. In the past, this type of antenna was greatly affected by environmental parameters, so it needed to be designed and adjusted continuously with the physical machine at different stages, which was time-consuming and labor-intensive.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

According to embodiments of the present disclosure, the present disclosure provides an antenna system, to solve or circumvent aforesaid problems and disadvantages in the related art.

An embodiment of the present disclosure is related to an antenna system, and the antenna system includes a defective ground structure board and an antenna structure board. The defective ground structure board includes a first insulating plate and a defective ground structure layer, and the defective ground structure layer is disposed on the first insulating plate. The antenna structure board is disposed on the defective ground structure board, the antenna structure board includes at least one antenna body and a second insulating plate, the at least one antenna body is disposed on the second insulating plate, and the second insulating plate is disposed on the defective on the ground structure layer.

In one embodiment of the present disclosure, the defective ground structure board further includes a ground layer, the ground layer is disposed under the first insulating plate, and the first insulating plate is disposed between the defective ground structure layer and the ground layer.

In one embodiment of the present disclosure, the at least one antenna body has a signal feed point, a first via and a second via, and the first via and the second via respectively penetrate through the second insulating plate, the defective ground structure layer and the first insulating plate for connecting the ground layer.

In one embodiment of the present disclosure, the at least one antenna body includes an inverted-F antenna and an asymmetrical T-structure component. The inverted-F antenna has the signal feed point and the first via. The asymmetrical T-structure component has the second via, the asymmetrical T-structure component is positioned outside the inverted-F antenna, and the asymmetrical T-structure component is disconnected from the inverted-F antenna.

In one embodiment of the present disclosure, the inverted-F antenna includes a main part, a step impedance transformation part and a connecting part. The step impedance transformation part is connected to the main part, and an end of the step impedance transformation part has the signal feed point. The connecting part is connected to the main part, and an end of the connecting part has the first via.

In one embodiment of the present disclosure, the inverted-F antenna further includes a T-shaped extension part. The T-shaped extension part is connected to the main part, and the step impedance transformation part is positioned between the connecting part and the T-shaped extension part.

In one embodiment of the present disclosure, the defective ground structure layer includes a plurality of gaps in a first direction and a plurality of gaps in a second direction. The plurality of gaps in the first direction are equally spaced from each other, the plurality of gaps in the second direction are equally spaced from each other, and the plurality of gaps in the second direction are perpendicular to the plurality of gaps in the first direction. The at least one antenna body overlaps the plurality of gaps in the first direction and the plurality of gaps in the second direction.

In one embodiment of the present disclosure, the plurality of gaps in the first direction at least includes a first gap in the first direction, a second gap in the first direction and a third gap in the first direction, the T-shaped extension part of the inverted-F antenna is positioned between the first gap in the first direction and the second gap in the first direction, the step impedance transformation part of the inverted-F antenna is positioned on the second gap in the first direction, the connecting part of the inverted-F antenna is positioned on the third gap in the first direction, the plurality of gaps in the second direction at least includes a first gap in the second direction and a second gap in the In the second direction, the main part of the inverted-F antenna is positioned on the first gap in the second direction, and the signal feed point and the first via of the inverted-F antenna and the second via of the asymmetrical T-structure component are positioned on the second gap in the second direction.

In one embodiment of the present disclosure, the at least one antenna body includes a first antenna body and a second antenna body. The first antenna body has a first signal feed point, a first via and a second via, and the first via and the second via are electrically connected to the ground layer. The second antenna body has a second signal feed point, a third via and a fourth via, the third via and the fourth via are electrically connected to the ground layer, and the first antenna body and the second antenna body are respectively positioned on two diagonal sections of the second insulating plate.

In one embodiment of the present disclosure, the first antenna body includes a first inverted-F antenna and a first asymmetrical T-structure component. The first asymmetrical T-structure component is positioned outside the first inverted-F antenna, and the first asymmetrical T-structure component is disconnected from the first inverted-F antenna. The second antenna body includes a second inverted-F antenna and a second asymmetrical T-structure component. The second asymmetrical T-structure component is positioned outside the second inverted-F antenna, and the second asymmetrical T-structure component is disconnected from the second inverted-F antenna.

In one embodiment of the present disclosure, the defective ground structure layer includes a first gap in a first direction, a second gap in the first direction, a third gap in the first direction, a fourth gap in the first direction, a fifth gap in the first direction and a sixth gap in the first direction, in order equally spaced, and a first gap in a second direction, a second gap in the second direction, a third gap in the second direction, a fourth gap in the second direction, a fifth gap in the second direction and a sixth gap in the second direction, in order equally spaced. The first to sixth gaps in the second direction are perpendicular to the first to sixth gaps in the first direction, and the first and second inverted-F antennas and the first and second asymmetrical T-structure components overlap the first to sixth gaps in the second direction and the first to sixth gaps in the first direction.

In one embodiment of the present disclosure, the first inverted-F antenna includes a first main part, a first step impedance transformation part, a first connecting part and a first T-shaped extension part, the first The step impedance transformation part, the first connecting part and the first T-shaped extension part are connected to the first main part, an end of the first step impedance transformation part has the first signal feed point, an end of the first connecting part has the first via, the first asymmetrical T-structure component has the second via, the first signal feed point and the first via of the first inverted-F antenna and the second via of the first asymmetrical T-structure component are positioned on the second gap in the second direction.

In one embodiment of the present disclosure, the first T-shaped extension part of the first inverted-F antenna is positioned between the first gap in the first direction and the second gap in the first direction, the first step impedance transformation part of the first inverted-F antenna is positioned on the second gap in the first direction, the first connecting part of the first inverted-F antenna is positioned on the third gap in the first direction, and the first main part of the first inverted-F antenna is positioned on the first gap in the second direction.

In one embodiment of the present disclosure, the second inverted-F antenna includes a second main part, a second step impedance transformation part, a second connecting part and a second T-shaped extension part, the second step impedance transformation part, the second connecting part and the second T-shaped extension part are connected to the second main part, an end of the second step impedance transformation part has the second signal feed point, an end of the second connecting part has the third via, the second asymmetrical T-structure component has the fourth via, the second signal feed point and the third via of the second inverted-F antenna and the fourth via of the second asymmetrical T-structure component are positioned on the fifth gap in the second direction.

In one embodiment of the present disclosure, the second connecting part of the second inverted-F antenna is positioned on the fourth gap in the first direction, the second step impedance transformation part of the second inverted-F antenna is positioned on the fifth gap in the first direction, the second T-shaped extension part of the second inverted-F antenna is positioned between the fifth gap in the first direction and the sixth gap in the first direction, and the second main part of the second inverted-F antenna is positioned on the sixth gap in the second direction.

In one embodiment of the present disclosure, the at least one antenna body further includes a third antenna body and a fourth antenna body. The third antenna body has a third signal feed point, a fifth via and a sixth via, and the fifth via and the sixth via are electrically connected to the ground layer. The fourth antenna body has a fourth signal feed point, a seventh via and an eighth via, the seventh via and the eighth via are electrically connected to the ground layer, and the third antenna body and the fourth antenna body are respectively positioned on two diagonal sections of the second insulating plate.

In one embodiment of the present disclosure, the third antenna body includes a third inverted-F antenna and a third asymmetrical T-structure component, the third asymmetrical T-structure component is positioned outside the third inverted-F antenna, the third asymmetrical T-structure component is disconnected from the third inverted-F antenna, the third inverted-F antenna includes a third main part, a third step impedance transformation part, a third connecting part and a third T-shaped extension part, the third step impedance transformation part, the third connecting part and the third T-shaped extension part are connected to the third main part, an end of the third step impedance transformation part has the third signal feed point, an end of the third connecting part has a fifth via, and the third asymmetrical T-structure component has the sixth via.

In one embodiment of the present disclosure, the third main part of the third inverted-F antenna is positioned on the first gap in the first direction, the third T-shaped extension of the third inverted-F antenna is positioned between the fifth gap in the second direction and the sixth gap in the second direction, the third step impedance transformation part of the third inverted-F antenna is positioned on the fifth gap in the second direction, the third connecting part of the third inverted-F antenna is positioned in the fourth gap in the second direction, and the third signal feed point and the fifth via of the third inverted-F antenna and the sixth via of the third asymmetrical T-structure component are positioned in the second gap in the first direction.

In one embodiment of the present disclosure, the fourth antenna body includes a fourth inverted-F antenna and a fourth asymmetrical T-structure component, the fourth asymmetrical T-structure component is positioned outside the fourth inverted-F antenna, the fourth asymmetrical T-structure component is disconnected from the fourth inverted-F antenna, the fourth inverted-F antenna includes a fourth main part, a fourth step impedance transformation part, a fourth connecting part and a fourth T-shaped extension part, the fourth step impedance transformation part, the fourth connecting part and the fourth T-shaped extension part are connected to the fourth main part, an end of the fourth step impedance transformation part has the fourth signal feed point, an end of the fourth connecting part has the seventh via, and the fourth asymmetrical T-structure component has the eighth via.

In one embodiment of the present disclosure, the fourth main part of the fourth inverted-F antenna is positioned on the sixth gap in the first direction, the fourth T-shaped extension part of the fourth inverted-F antenna is positioned between the first gap in the second direction and the second gap in the second direction, the fourth step impedance transformation part of the fourth inverted-F antenna is positioned on the second gap in the second direction, the fourth connecting part of the fourth inverted-F antenna is positioned in the third gap in the second direction, and the fourth signal feed point and the seventh via of the fourth inverted-F antenna and the eighth via of the fourth asymmetrical T-structure component are positioned on the fifth gap in the first direction.

In view of the above, the technical solution of the present disclosure has obvious advantages and beneficial effects compared with the prior art. With the structure of the antenna system of the present disclosure, multiple antennas can be placed in a limited space, and it has the advantages of high performance, low cost, simple manufacturing process, and low environmental interference of antenna parameters, etc., and the antenna system can be widely used in various electronic devices without cumbersome and complicated adjustment design.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
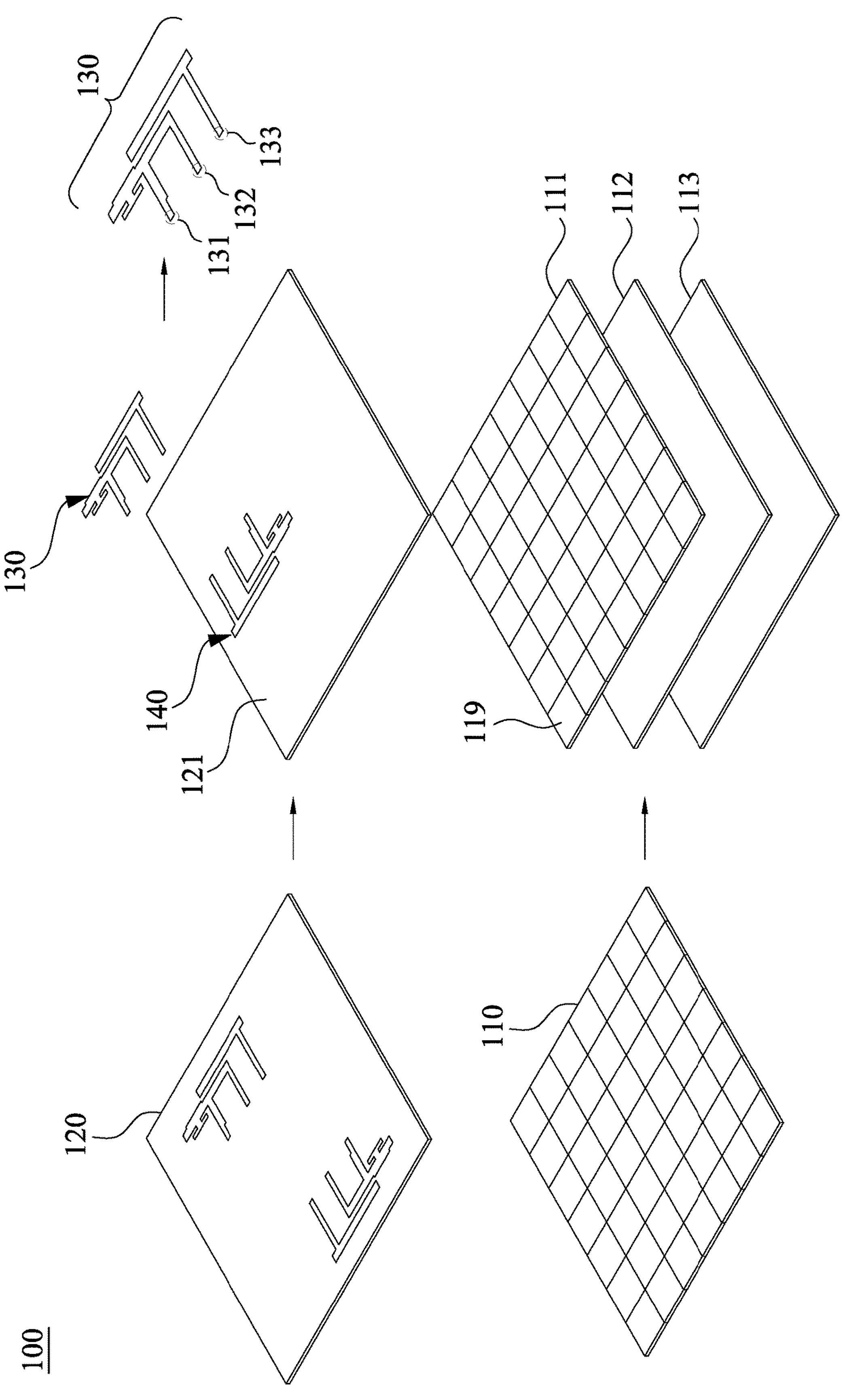
FIG. 1 is an explosion diagram of an antenna system according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Referring to FIG. 1. In one aspect, the present disclosure is directed to an antenna system 100. This antenna system may be easily integrated into a electronic device and may be applicable or readily adaptable to all technologies. The antenna system 100 of the present disclosure can effectively improve the driving capability. Accordingly, the pixel circuit 100 has advantages. Herewith the antenna system 100 is described below with FIG. 1.

The subject disclosure provides the antenna system of FIG. 1 in accordance with the subject technology. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

FIG. 1 is an explosion diagram of the antenna system 100 according to one embodiment of the present disclosure. As shown in FIG. 1, the antenna system 100 includes antenna system 100 including a defective ground structure board 110 and an antenna structure board 120. In structure, the antenna structure board 120 is disposed on the defective ground structure board 110. The present disclosure uses the defect grounding structure technology to disturb the current path, so as to generate the resonance mode. Thus, the strong current is distributed on the defective ground structure board 110 and the antenna structure board 120 at the same time.

In FIG. 1, the defective ground structure board 110 includes the first insulating plate 112, the defective ground structure layer 111 and the ground layer 113. In structure, the defective ground structure layer 111 is disposed on the first insulating plate 112, the ground layer 113 is disposed under the first insulating plate 112, and the first insulating plate 112 is positioned between the defective ground structure layer 111 and the ground layer 113. In practice, for example, the size of the defective ground structure board 110 may be about 88.2 mm×88.2 mm×0.4 mm. In practice, the thickness of the defective ground structure board 110 may not be only about 0.4 mm; better results can be obtained with a thicker thickness, the thickness of the defective ground structure board 110 may be up to about 3 mm, but the present disclosure is not limited to the aforementioned values. The first insulating plate 112 can be FR4 planar plate or other planar insulating plates. Double-sided conductive layers (e.g., copper foils) are formed on the upper and lower sides of the first insulating plate 112. One side is full of copper foil as the ground layer 113, and the other side is a copper foil having grooves as the defective ground structure layer 111.

In practice, a periodic structure is engraved on the defective ground structure layer 111 to perturb the current path, so as to achieve the purpose of reducing the size and increasing or decreasing the modes. The aforementioned periodic structure may include a plurality of horizontal gaps and a plurality of vertical gaps, the horizontal gaps are perpendicular to the vertical gaps, so as to form a plurality of blocks 119 (e.g., copper foil blocks). For example, the gap on the side edge of the defective ground structure layer 111 can be about 0.1 mm, the horizontal and vertical gaps in the defective ground structure layer 111 can be about 0.2 mm, and the gap of 0.1/0.2 mm is only a suggested range. In practice, the adjustment of the working frequency can be achieved by adjusting the size of the gaps and the blocks, the gap can be up to 1 mm, but the present disclosure is not limited to the aforementioned values. The length and width of a single block 119 may be about 10-34 mm (e.g., about 16 mm), but the present disclosure is not limited thereto.

By using defect grounding structure technology, the antenna system 100 has the advantages of ultra-thin thickness (e.g., about 0.6 mm), low environmental interference of antenna parameters, etc., and the antenna system 100 can be widely used in various electronic devices without cumbersome and complicated adjustment design.

In FIG. 1, the antenna structure board 120 includes a first antenna body 130, a second antenna body 140 and a second insulating plate 121. In structure, the first antenna body 130 and the second antenna body 140 are disposed on the second insulating plate 121, and the first antenna body 130 and the second antenna body 140 are respectively positioned on two diagonal sections of the second insulating plate 121 to reduce interference, and the second insulating plate 121 is disposed on the defective ground structure layer 1 superior. It should be noted that although the first antenna body 130 and the second antenna body 140 are shown in FIG. 1, the present disclosure is not limited to the number of antenna bodies. In practice, the number of antenna bodies can be at least one or more than two. Those skilled in the art may choose the number of antenna bodies flexibly according to the actual application.

In practice, for example, the size of the antenna structure board 120 may be about 88.2 mm×88.2 mm and the thickness is only about 0.2 mm. In practice, the thickness of antenna structure board 120 may not be only 0.2 mm; in fact, better results can be obtained with a thicker thickness, the thickness of the antenna structure board 120 may be up to about 2 mm, but the present disclosure is not limited to the aforementioned values. The second insulating plate 121 can be the FR4 planar plate or other planar insulating plates, and a single-side conductive layer (e.g., copper foil) is formed on one side of the second insulating plate 121 to be designed as the first antenna body 130 and the second antenna body 140.

It should be understood that the traditional Wi-Fi 6E frequency band antenna needs to be designed in accordance with different placement positions and different parameter environments, which is quite time-consuming and expensive. In practice, for example, the antenna system 100 of the present disclosure can serve as a defective ground structure antenna in the Wi-Fi 6E frequency band, which can use double-layer FR4 planar boards or other boards to make the defective ground structure board 110 and antenna structure board 120, the antenna system 100 is easy to be placed in the space of the electronic device and is less affected by environmental parameters. Therefore, antenna system 100 can be modularized as a commodity. In addition, the antenna system 100 of the present disclosure can serve as a defective ground structure antenna in the Wi-Fi 6E frequency band, covering the low frequency 2.4 GHz to 2.5 GHz and the high frequency 5.15 GHz to 7.125 GHz of Wi-Fi 6E, and therefore, the antenna system 100 is not limited to single frequency or narrowband applications.

As shown in FIG. 1, in one embodiment of the present disclosure, the first antenna body 130 has a first signal feed point 131, a first via 132 and a second via 133, and the first via 132 and the second via 133 are electrically connected to the ground layer 113. It should be noted that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. For example, the first via 132 and the second via 133 can be indirectly electrically coupled to the ground layer 113 through wires; alternatively, the first via 132 and the second via 133 respectively penetrate through the second insulating plate 121, the defective ground structure layer 111 and the first insulating plate 112 for connecting to the ground layer 113. In this way, the antenna system 100 has a simple manufacturing process, is less affected by environmental parameters, and is easy to be modularized.

In practice, the structure of the second antenna body 140 is the same as that of the first antenna body 130, so it is not be repeated herein. It should be noted that terms such as "first", "second", "third", etc. used herein are only used to describe different elements, and have no limitation on the elements themselves. Therefore, the first element can also be renamed as the second element.

Figure 2:
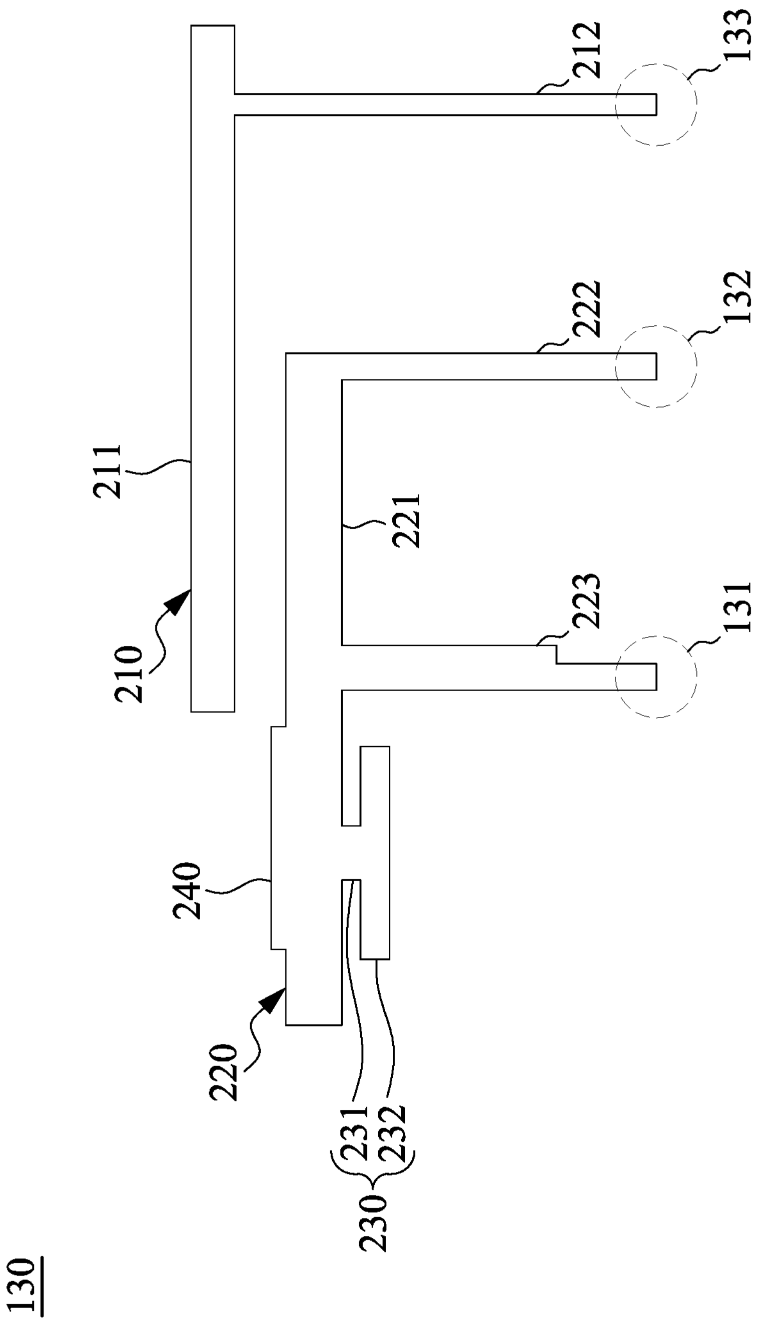
FIG. 2 is a top view of a first antenna body in FIG. 1.

FIG. 2 is a top view of a first antenna body in FIG. 1. As shown in FIG. 2, the first antenna body 130 includes a first inverted-F antenna 220 and a first asymmetrical T-structure component 210.

In structure, the first inverted-F antenna 220 has the first signal feed point 131 and the first via 132; the first asymmetrical T-structure component 210 has the second via 133. The first asymmetrical T-structure component 210 is positioned outside the first inverted-F antenna 220, and the first asymmetrical T-structure component 210 is disconnected from the first inverted-F antenna 220. The asymmetrical T-structure component 210 includes a component 211 and a component 212, the component 212 is vertically connected to the component 211, and the end of component 212 has the second via 133. In use, the first asymmetrical T-structure component 210 can match the dual-frequency mode of the antenna (e.g., the first inverted-F antenna 220) resonated throughout the antenna body.

As shown in FIG. 2, in one embodiment of the present disclosure, the first inverted-F antenna 220 can include a first main part 221, a first step impedance transformation part 223 and a first connecting part 222. In structure, the first connecting part 222 is connected to the first main part 221, and the end of first connecting part 222 has first via 132. The first step impedance transformation part 223 is connected to the first main part 221, and the end of the first step impedance transformation part 223 has the first signal feed point 131. In this way, the first step impedance transformation part 223 (e.g., a stepped-impedance converter) is used as the signal feed-in line above the first signal feed point 131, and the signal feed-in line is designed from thin to thick, which can reduce the reflection loss while the signal is fed in the signal feed-in line.

As shown in FIG. 2, in one embodiment of the present disclosure, the first inverted-F antenna 220 can also include a first T-shaped extension part 230. In structure, the first T-shaped extension part 230 is connected to the first main part 221, and the first step impedance transformation part 223 is positioned between the first connecting part 222 and the first T-shaped extension part 230. The first T-shaped extension part 230 includes an extension portion 231 and an extension portion 232, the extension portion 231 is vertically connected to the first main part 221, the extension portion 232 is vertically connected to the extension portion 231, and the extension portion 232 is roughly parallel to the first main part 221. In use, the first T-shaped extension part 230 extended from the first inverted-F antenna 220 can match the low-frequency bandwidth of the antenna and maintain the match for the high-frequency bandwidth.

As shown in FIG. 2, in one embodiment of the present disclosure, the first inverted-F antenna 220 may also include a first straight-line extension part 240. In structure, the straight-line extension portion 240 is connected to the first main part 221, and the first straight-line extension part 240 is roughly parallel to the first main part 221. In use, the first straight-line extension part 240 can assist the above-mentioned function of the first T-shaped extension part 230, but the present disclosure is not limited thereto.

Figure 3:
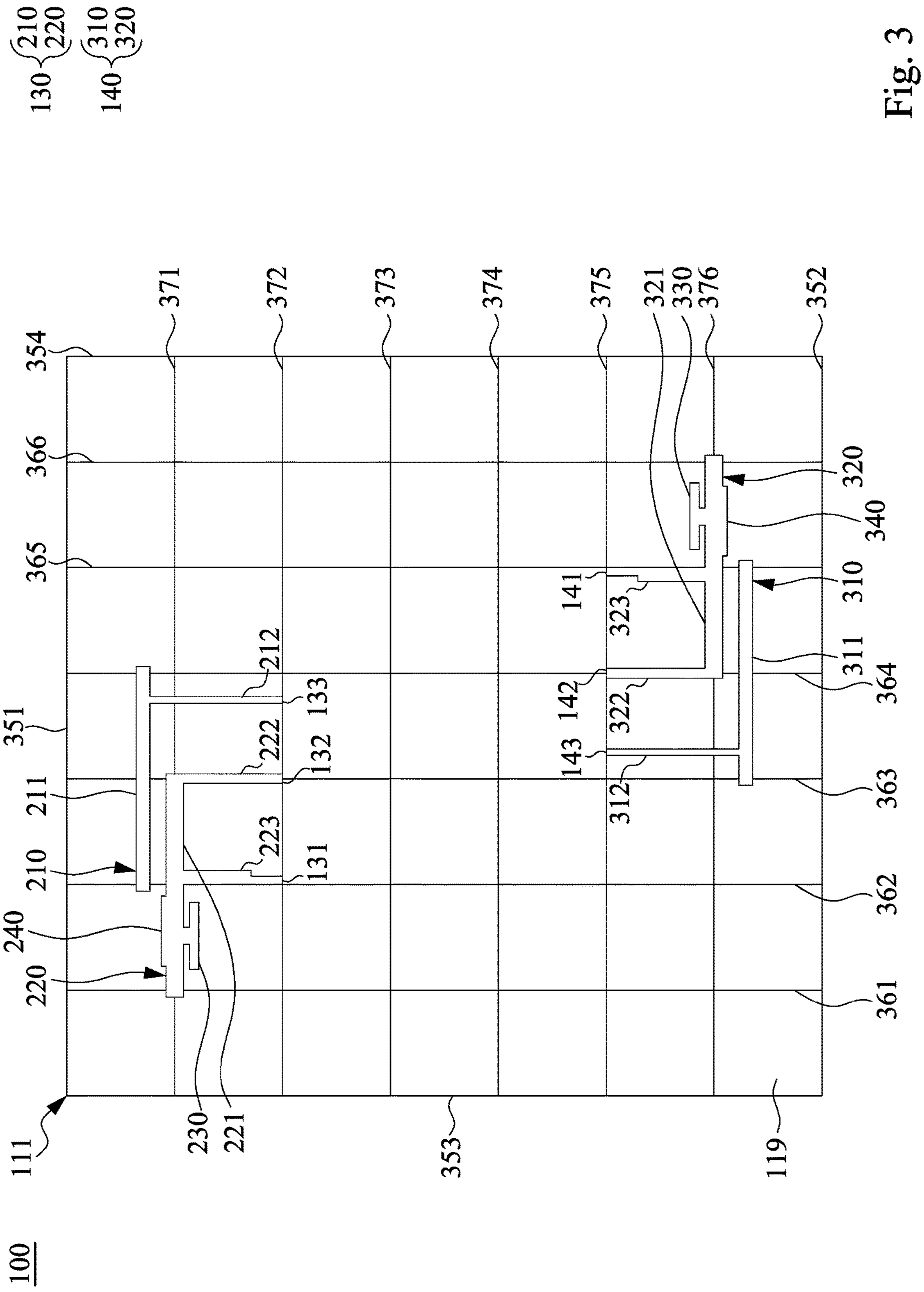
FIG. 3 is a top view of first and second antenna bodies and a defective ground structure layer in the antenna system in FIG. 1.

In order to describe the positional relationship among the first and second antenna bodies 130 and 140 and the defective ground structure layer 111, with reference to FIGS. 1 to 3, FIG. 3 is a top view of the first and second antenna bodies 130 and 140 and the defective ground structure layer 111 in the antenna system 100 in FIG. 1. It should be noted that in order to facilitate the explanation of the positional relationship among the first and second antenna bodies 130 and 140 and the defective ground structure layer 111, the second insulating plate 121 positioned among the first and second antenna bodies 130 and 140 and the defective ground structure layer 111 is not shown in FIG. 3.

As shown in FIG. 3, in one embodiment of the present disclosure, the defective ground structure layer 111 includes a plurality of gaps in the first direction and a plurality of gaps in the second direction, and the plurality of gaps in the first direction are perpendicular to the plurality of gaps in the second direction. In FIG. 3, the aforementioned plurality of gaps in the first direction can include a first gap 361 in the first direction, a second gap 362 in the first direction, a third gap 363 in the first direction, a fourth gap 364 in the first direction, a fifth gap 365 in the first direction and a sixth gap 366 in the first direction, in order equally spaced from each other. Similarly, the aforementioned plurality of gaps in the second direction can include a first gap 371 in the second direction, a second gap 372 in the second direction, a third gap 373 in the second direction, a fourth gap 374 in the second direction, a fifth gap 375 in the second direction and sixth gap 376 in the second direction, in order equally spaced from each other. The first and second antenna bodies 130 and 140 overlap the aforementioned plurality of gaps in the first and second direction; specifically, the first and second inverted-F antennas 220 and 320 and the first and second asymmetrical T-structure components 210 and 310 overlap the first to the sixth gaps 371-376 in the second direction and the first to the sixth gaps 361-366 in the first direction. The periodic structure is engraved on the defective ground structure layer 111 through the gaps in the first and second directions to perturb the current path, so as to achieve the purpose of reducing the size and increasing or decreasing the modes.

Regarding the plurality of gaps in the first direction, in structure, the first T-shaped extension part 230 of the first inverted-F antenna 220 is positioned between the first gap 361 in the first direction and the second gap 362 in the first direction, the first step impedance transformation part 223 of the first inverted-F antenna 220 is positioned on the second gap 362 in the first direction, the end of the first step impedance transformation part 223 has the first signal feed point 131, the first connecting part 222 of the first inverted-F antenna 220 is positioned on the third gap 362 in the first direction, the end of the first connecting part 222 part has the first via 132, the first via 132 is electrically connected to the ground layer 113 (shown in FIG. 1), and the component 212 of the first asymmetrical T-structure component 210 can be optionally positioned between the third gap 363 in the first direction and the fourth gap 364 in the first direction. Similarly, the second connecting part 322 of the second inverted-F antenna 320 is positioned on the fourth gap 364 in the first direction, the end of the second connecting part 322 has the third via 142, and the third via 142 is electrically connected to the ground layer 113 (shown in FIG. 1), the second step impedance transformation part 323 of the second inverted-F antenna 320 is positioned on the fifth gap 365 in the first direction, the second step impedance transformation part 323 has a second signal feed point 141, the second T-shaped extension part 330 of the second inverted-F antenna 320 is positioned on between the fifth gap 366 in the first direction and the sixth gap 366 in the first direction, and the component 312 of the second asymmetrical T-structure component 310 can be optionally positioned between the third gap in the first direction 363 and the fourth gap in the first direction 364.

Regarding the plurality of gaps in the second direction, in structure, the first main part 221 of the first inverted-F antenna 220 is positioned at the first gap 371 in the second direction, the first T-shaped extension part 230 and the first straight-line extension part 240 are respectively positioned at the opposite sides of the first main part 221 of the first inverted-F antenna 220, the first asymmetrical T-structure component 210 has the second via 133, the second via 133 is electrically connected to the ground layer 113 (shown in FIG. 1), the first signal feed point 131 and the first via 132 of the first inverted-F antenna 220 and the second via 133 of the first asymmetrical T-structure component 210 are positioned on the second gap 372 in the second direction, and the component 211 of the first asymmetrical T-structure component 210 can be optionally positioned between the first side edge 351 of the defective ground structure layer 111 and the first gap 371 in the second direction. Similarly, the second main part 321 of the second inverted-F antenna 320 is positioned on the sixth gap 376 in the second direction, the second T-shaped extension part 330 and the second straight-line extension part 340 are respectively positioned at the opposite sides of the second main part 321 of the second inverted-F antenna 320, the second asymmetrical T-structure component 310 has the fourth via 143, the fourth via 143 is electrically connected to the ground layer 113 (shown in FIG. 1), The second signal feed point 141 and the third via 142 of the second inverted-F antenna 320 and the fourth via 142 of the second asymmetrical T-structure component 310 are positioned on the fifth gap 375 in the second direction, and the component 311 of the second asymmetrical T-structure component 310 can be optionally positioned between the second side edge 352 of the defective ground structure layer 111 and the sixth gap 376 in the second direction.

Figure 4:
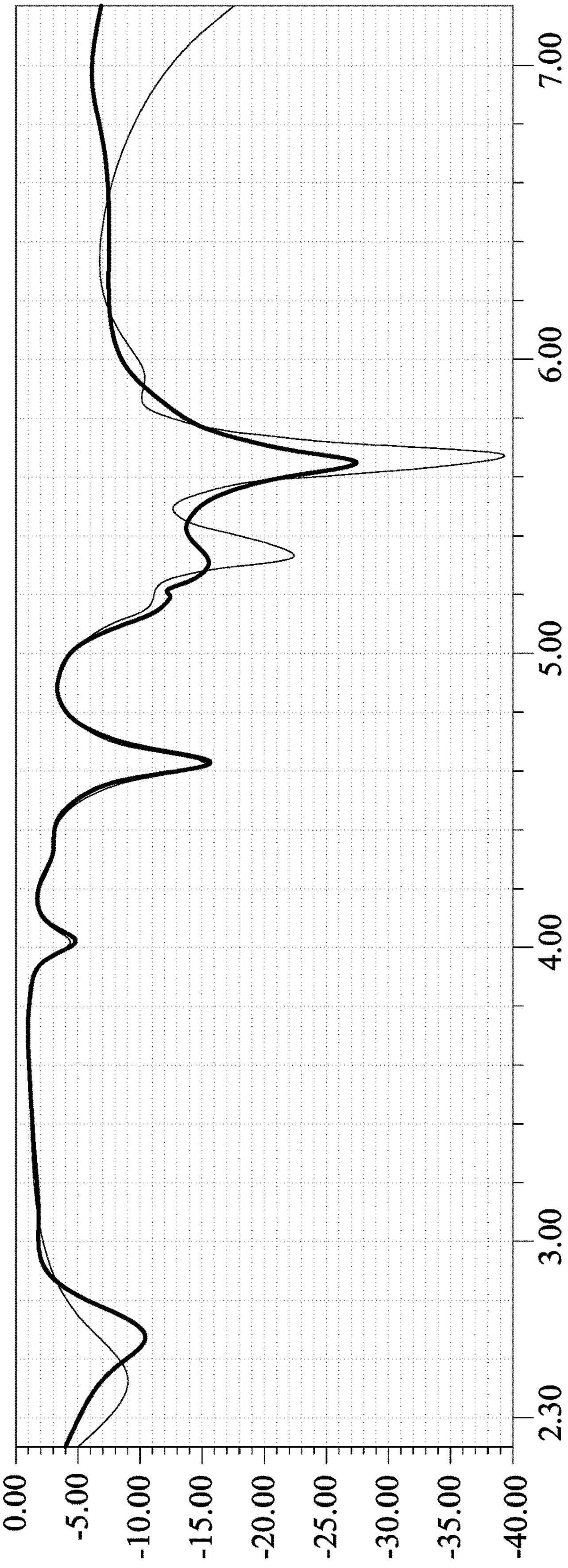
FIG. 4 is a reflection loss diagram of the antenna system in FIG. 1 and FIG. 3.

Due to the positional relationship between the first and second antenna bodies 130 and 140 and the defective ground structure layer 111 in FIG. 3, the antenna system 100 has extremely low return loss, as shown in FIG. 4. FIG. 4 is a reflection loss diagram of the antenna system in FIG. 1 and FIG. 3, in which the abscissa is the frequency (GHz), and the ordinate is the loss value (dB). It should be noted that the return loss is a parameter that quantifies the basic performance of the antenna. In general, the lower return loss is better, and the standard return loss of common Netcom products is about −6 (dB). In FIG. 4, the antenna system 100 is a defective ground structure antenna system with a 2-receiving and 2-transmitting function, which can support the Wi-Fi 6E communication frequency band, and the reflection loss (i.e., the return loss) of this frequency band is much lower than the −6 dB standard.

Figure 5:
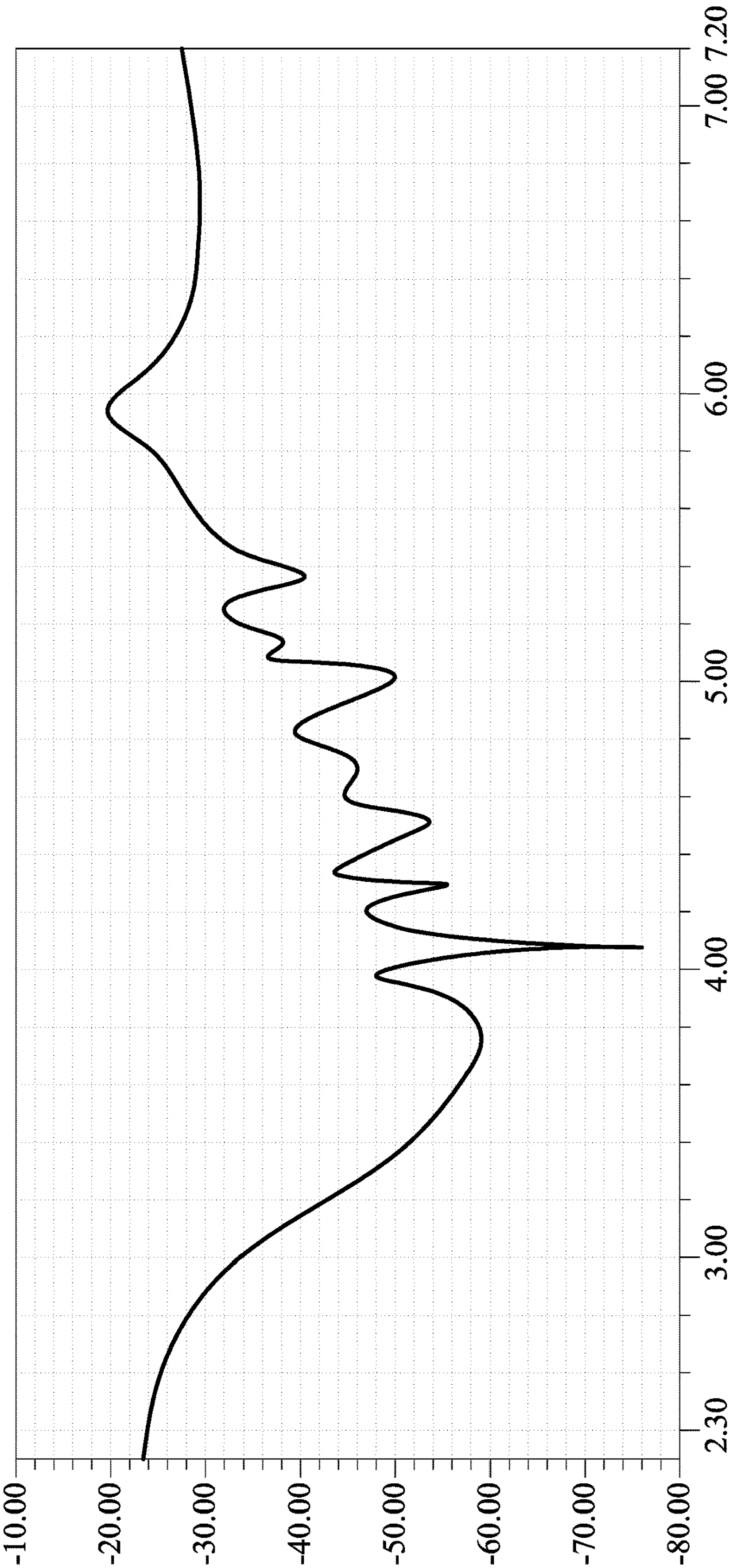
FIG. 5 is a chart of the isolation of the antenna system in FIG. 1 and FIG. 3.

On the other hand, due to the positional relationship between the first and second antenna bodies 130 and 140 and the defective ground structure layer 111, there is the good isolation between the first antenna body 130 and the second antenna body 140, as shown in FIG. 5. FIG. 5 is a chart of the isolation of the antenna system 100 in FIG. 1 and FIG. 3, in which the abscissa is the frequency (GHz), and the ordinate is the loss value (dB). It should be noted that the isolation is to quantify the interference between antenna bodies. In general, the lower isolation value is better. In FIG. 5, there is a very low isolation value between the antenna bodies.

Figure 6:
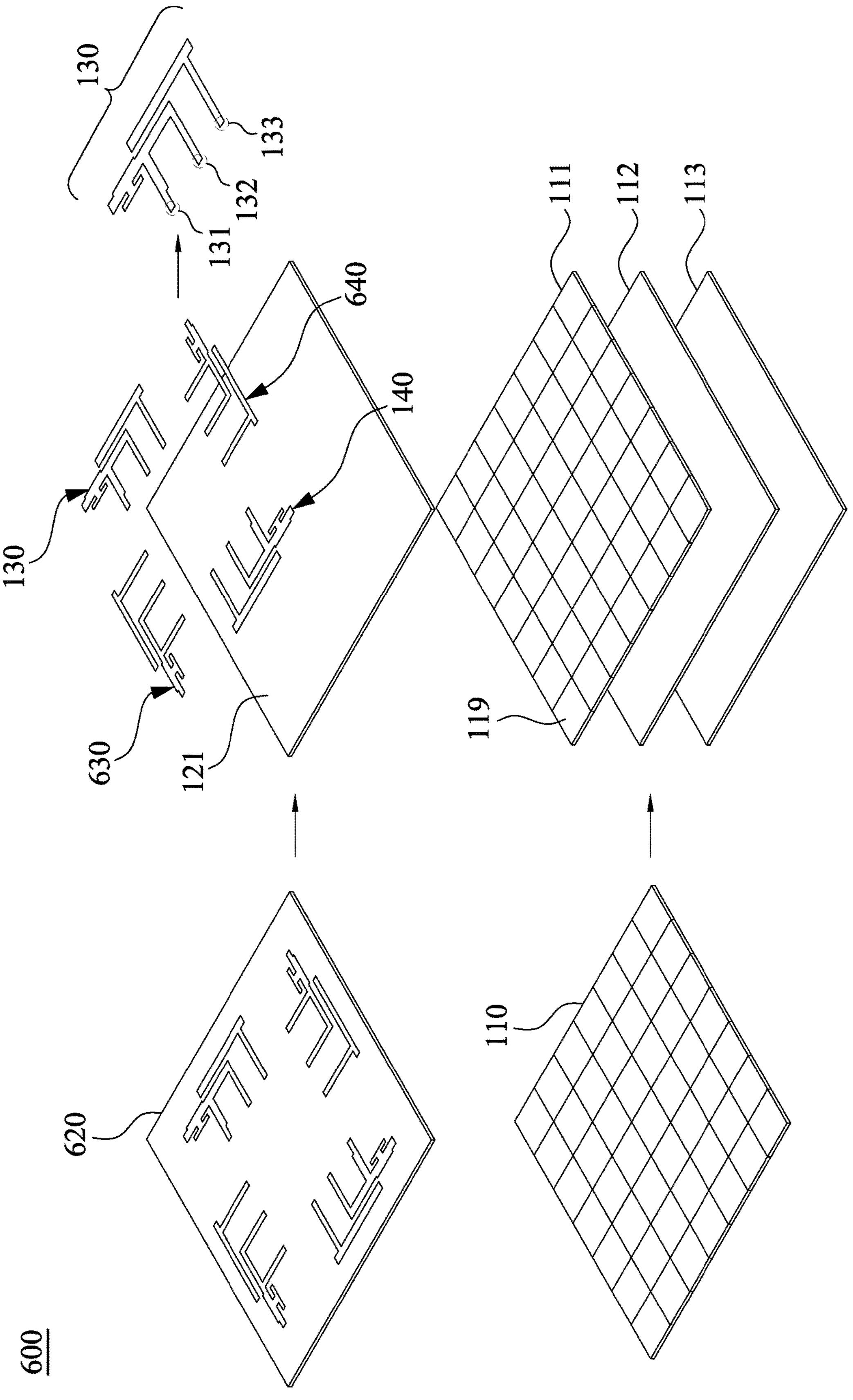
FIG. 6 is an explosion diagram of an antenna system according to another embodiment of the present disclosure.

FIG. 6 is an explosion diagram of an antenna system 600 according to another embodiment of the present disclosure. Compared with antenna system 100 in FIG. 1, the antenna structure board 620 of antenna system 600 in FIG. 6 has the first antenna body 130, the second antenna body 140, a third antenna body 630 and a fourth antenna body 640. In structure, the first antenna body 130, the second antenna body 140, the third antenna body 630 and the fourth antenna body 640 are disposed on the second insulating plate 121. The first antenna body 130 and the second antenna body 140 are respectively positioned on two diagonal sections of the second insulating plate 121, and the third antenna body 630 and fourth antenna body 640 are respectively positioned on another two diagonal sections of the second insulating plate 121, so as to reduce interference. The first, second, third and fourth antenna bodies 130, 140, 630 and 640 overlap the plurality of gaps in the first and second directions of the defective ground structure layer 111.

Figure 7:
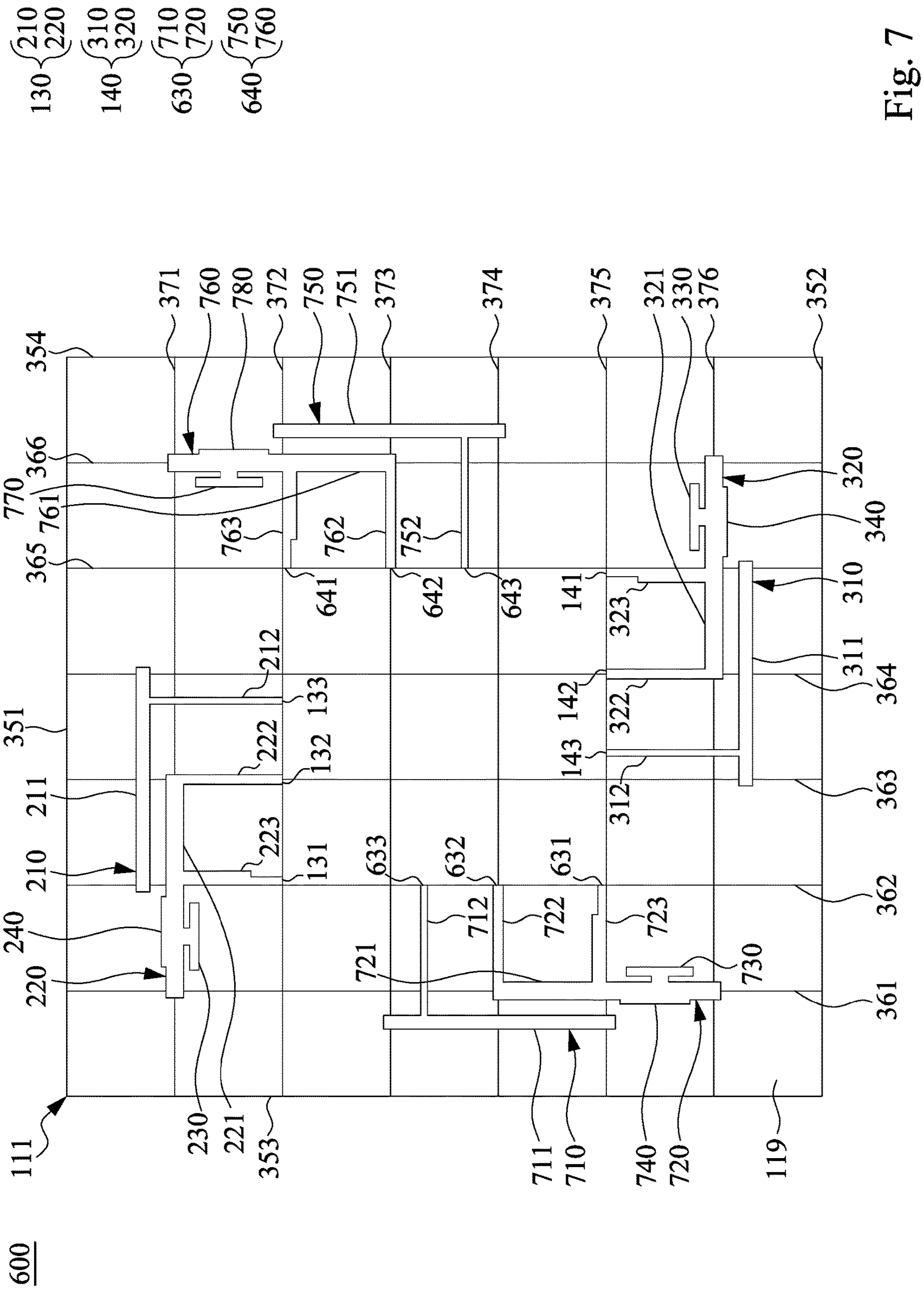
FIG. 7 is a top view of first, second, third and fourth antenna bodies and a defective ground structure layer in the antenna system in FIG. 6.

In order to describe the positional relationship among the first, second, third and fourth antenna bodies 130, 140, 630 and 640 and the defective ground structure layer 111, with reference to FIGS. 6 and 7, FIG. 7 is a top view of the first, second, third and fourth antenna bodies 130, 140, 630 and 640 and the defective ground structure layer 110 in the antenna system 600 in FIG. 6. It should be noted that in order to facilitate the explanation of the positional relationship among the first, second, third and fourth antenna bodies 130, 140, 630 and 640 and the defective ground structure layer 111, the second insulating plate 121 positioned among the first, second, third and fourth antenna bodies 130, 140, 630 and 640 and the defective ground structure layer 111 is not shown in FIG. 7.

As shown in FIG. 7, the third antenna body 630 includes a third inverted-F antenna 720 and a third asymmetrical T-structure component 710. In structure, the third asymmetrical T-structure component 710 is positioned outside the third inverted-F antenna 720, and the third asymmetrical T-structure component 710 is disconnected from the third inverted-F antenna 720.

The third inverted-F antenna 720 includes a third main part 721, a third step impedance transformation part 723, a third connecting part 722, a third T-shaped extension part 730 and a third straight-line extension part 740. In structure, the third step impedance transformation part 723, the third connecting part 722, the third T-shaped extension part 730 and the third straight-line extension part 740 are connected to the third main part 721, the third T-shaped extension part 730 and third straight-line extension part 740 are respectively positioned at two opposite sides of the third main part 721, the end of third step impedance transformation part 723 has third signal feed point 631, the end of third connecting part 722 has the fifth via 632, and the fifth via 632 is electrically connected to the ground layer 113 (shown in FIG. 6). The third main part 721 of the third inverted-F antenna 720 The is positioned on the first gap 361 in the first direction, the third T-shaped extension part 730 of the third inverted-F antenna 720 is positioned between the fifth gap 375 in the second direction and the sixth gap 376 in the second direction, the third step The transformation part 722 of the third inverted-F antenna 720 is positioned on the fifth gap 375 in the second direction, the third connecting part 722 of the third inverted-F antenna 720 is positioned in the fourth gap 374 in the second direction, and the third signal feed point 631 and the fifth via 632 of the third inverted-F antenna 720 are positioned on the second gap 362 in the first direction.

The third asymmetrical T-structure component 710 has a sixth via 633, the sixth via 633 is electrically connected to the ground layer 113 (shown in FIG. 1), and the sixth via 633 of the third asymmetrical T-structure component 710 is positioned on the second gap 362 in the first direction. For example, the component 711 of the third asymmetrical T-structure component 710 can be optionally positioned between the third side edge 353 of the defective ground structure layer 111 and the first gap 361 in the first direction, and the component 712 of the third asymmetrical T-structure component 710 can be optionally positioned between the third gap 373 in the second direction and the fourth gap 374 in the second direction.

As shown in FIG. 7, the fourth antenna body 640 includes a fourth inverted-F antenna 760 and a fourth asymmetrical T-structure component 750. In structure, the fourth asymmetrical T-structure component 750 is positioned outside the fourth inverted-F antenna 760, and the fourth asymmetrical T-structure component 750 is disconnected from the fourth inverted-F antenna 760.

The fourth inverted-F antenna 760 includes a fourth main part 761, a fourth step impedance transformation part 763, a fourth connecting part 762, a fourth T-shaped extension part 770 and a fourth straight-line extension part 780. In structure, the fourth step impedance transformation part 763, the fourth connecting part 762, the fourth T-shaped extension part 770 and the fourth straight-line extension part 780 are connected to the fourth main part 761, the fourth T-shaped extension part 770 and the fourth straight-line extension part 780 are respectively positioned at two opposite sides of the fourth main part 761, the end of fourth step impedance transformation part 763 has a fourth signal feed point 641, the end of fourth connecting part 762 has seventh via 642, and the seventh via 642 is electrically connected to ground layer 113 (shown in FIG. 6). The fourth main part 761 of the fourth inverted-F antenna 760 is positioned on the sixth gap 366 in the first direction, the fourth T-shaped extension part 770 of the fourth inverted-F antenna 760 is positioned between the first gap 371 in the second direction and the second gap 372 in the second direction, the fourth step impedance transformation part 763 of the fourth inverted-F antenna 760 is positioned on the second gap 372 in the second direction, the fourth connecting part 762 of the fourth inverted-F antenna 760 is positioned in the third gap 373 in the second direction, and the fourth signal feed point 641 and the seventh via 642 of the fourth inverted-F antenna 760 are positioned on the gap 365 in the first direction.

The fourth asymmetrical T-structure component 750 has an eighth via 643, and the eighth via 643 is electrically connected to the ground layer 113 (shown in FIG. 6), and the eighth via 643 of the fourth asymmetrical T-structure component 750 is positioned on the fifth gap 365 in the first direction. For example, the component 751 of the fourth asymmetrical T-structure component 750 can be optionally positioned between the fourth side edge 354 of the defective ground structure layer 111 and the sixth gap 366 in the first direction, and the component 752 of the fourth asymmetrical T-structure component 750 can be optionally positioned between the third gap 373 in the second direction and the fourth gap 374 in the second direction.

The placement of the first, second, third, and fourth antenna bodies 130, 140, 630 and 640 in FIG. 7 can improve the isolation among these antenna bodies, can stagger the directions of polarization, and also can enhance the ability of receiving signals in different directions.

Figure 8:
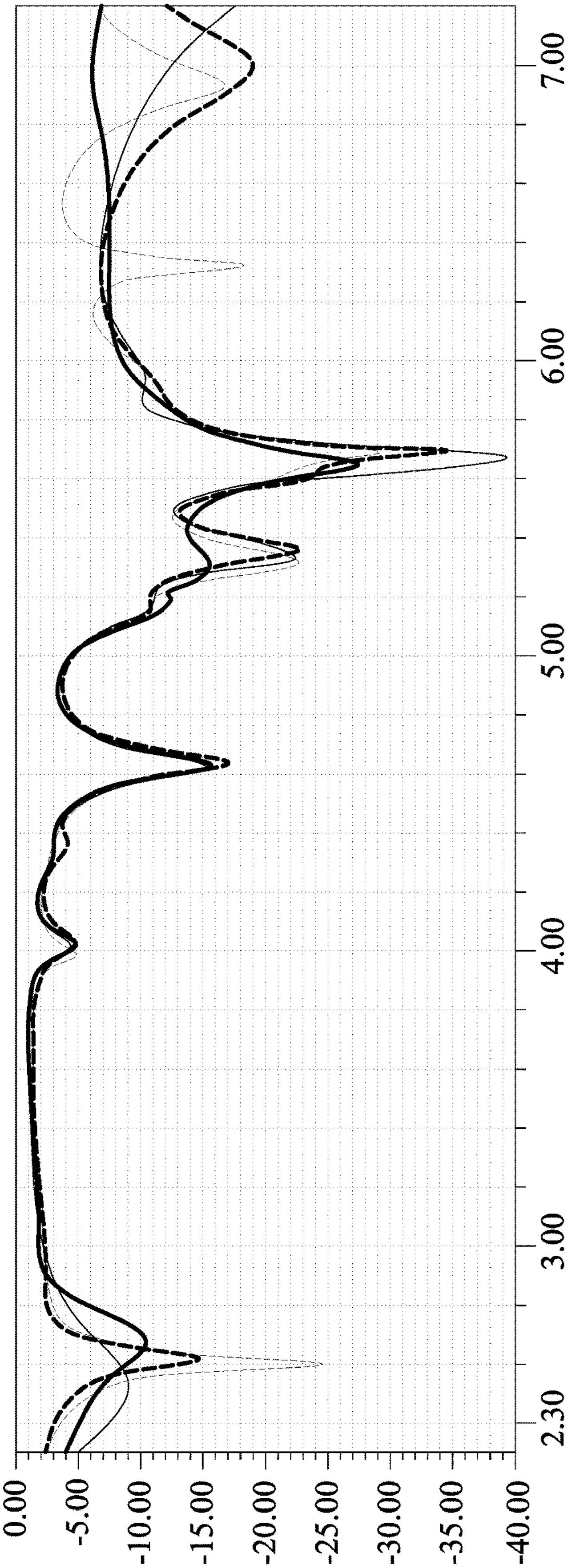
FIG. 8 is a reflection loss diagram of the antenna system in FIG. 6 and FIG. 7.

Due to the positional relationship among the first second, third and fourth antenna bodies 130, 140, 630 and 640 and the defective ground structure layer 111 in FIG. 7, the antenna system 600 has extremely low return loss, as shown in FIG. 8. FIG. 8 is a reflection loss diagram of the antenna system 600 in FIG. 6 and FIG. 7, in which the abscissa is the frequency (GHz), and the ordinate is the loss value (dB). It should be noted that the return loss is a parameter that quantifies the basic performance of the antenna. In general, the lower return loss is better, and the standard return loss of common Netcom products is about −6 (dB). In FIG. 8, the antenna system 600 is a defective ground structure antenna system with a 4-receiving and 4-transmitting function, which can support the Wi-Fi 6E communication frequency band, and the reflection loss (i.e., the return loss) of this frequency band is much lower than the −6 dB standard.

Figure 9:
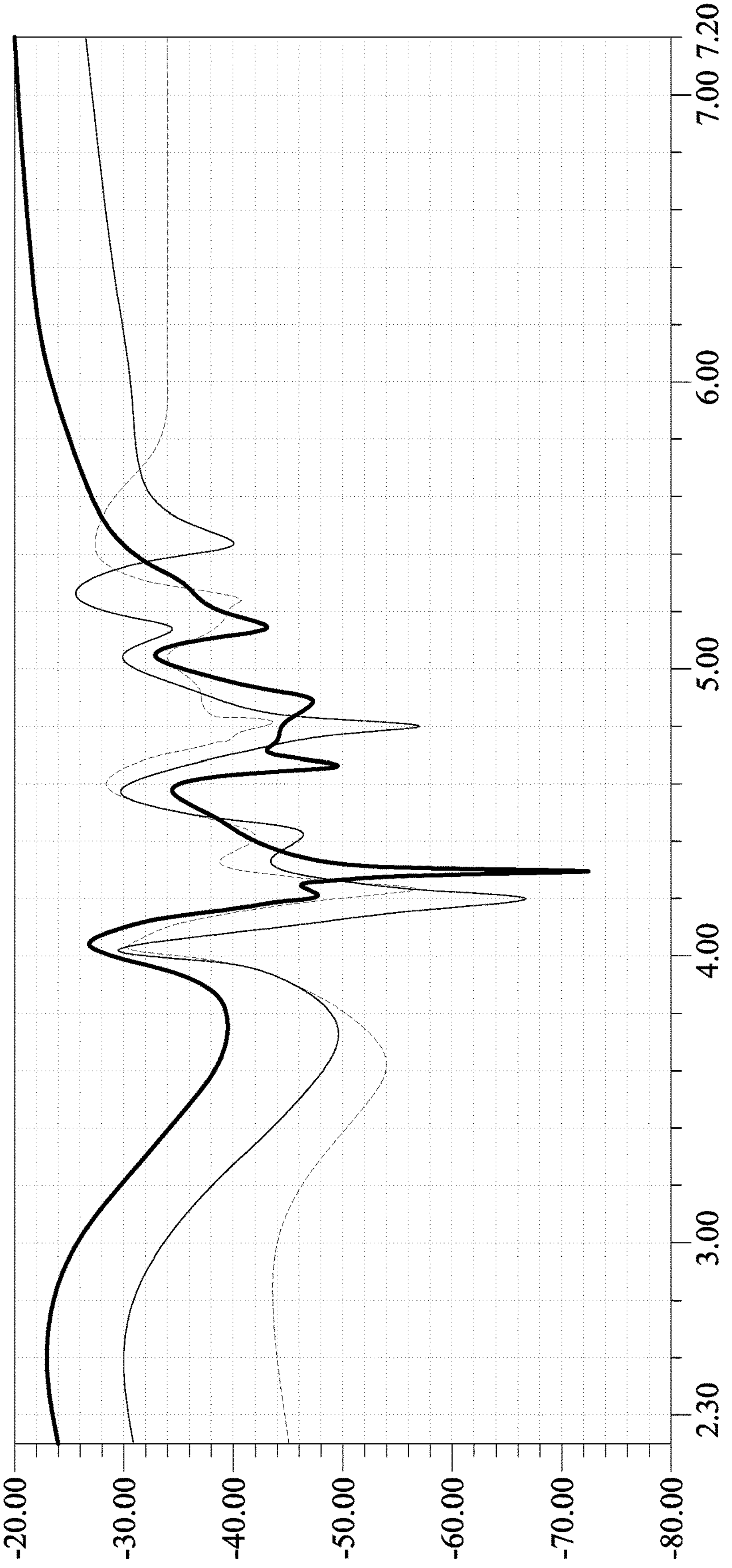
FIG. 9 is a chart of the isolation of the antenna system in FIG. 6 and FIG. 7.

On the other hand, due to the positional relationship among the first second, third and fourth antenna bodies 130, 140, 630 and 640 and the defective ground structure layer 111, there is the good isolation among the first second, third and fourth antenna bodies 130, 140, 630 and 640, as shown in FIG. 9. FIG. 9 is a chart of the isolation of the antenna system 600 in FIG. 6 and FIG. 7, in which the abscissa is the frequency (GHz), and the ordinate is the loss value (dB). It should be noted that the isolation is to quantify the interference between antenna bodies. In general, the lower isolation value is better. The distances between the first, second, third and fourth antenna bodies 130, 140, 630 and 640 are similar; for example, the distance between the nearest antenna bodies is only about 15 mm. In FIG. 9, there is a very low isolation value between the antenna bodies.

In view of the above, the technical solution of the present disclosure has obvious advantages and beneficial effects compared with the prior art. With the structure of the antenna system 100 and/or 600 of the present disclosure, multiple antennas can be placed in a limited space, and it has the advantages of high performance, low cost, simple manufacturing process, and low environmental interference of antenna parameters, etc., and the antenna system can be widely used in various electronic devices without cumbersome and complicated adjustment design.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An antenna system, comprising:

a defective ground structure board comprising a first insulating plate and a defective ground structure layer, and the defective ground structure layer disposed on the first insulating plate; and an antenna structure board disposed on the defective ground structure board, the antenna structure board comprising at least one antenna body and a second insulating plate, the at least one antenna body disposed on the second insulating plate, and the second insulating plate disposed on the defective on the ground structure layer, wherein the defective ground structure board further comprises a ground layer, the ground layer is disposed under the first insulating plate, and the first insulating plate is disposed between the defective ground structure layer and the ground layer, wherein the at least one antenna body comprises: a first antenna body having a first signal feed point, a first via and a second via, and the first via and the second via electrically connected to the ground layer; and a second antenna body having a second signal feed point, a third via and a fourth via, the third via and the fourth via electrically connected to the ground layer, and the first antenna body and the second antenna body respectively positioned on two diagonal sections of the second insulating plate.

2. The antenna system of claim 1, wherein the first via and the second via respectively penetrate through the second insulating plate, the defective ground structure layer and the first insulating plate for connecting the ground layer.

3. The antenna system of claim 2, wherein the first antenna body comprises:

an inverted-F antenna having the first signal feed point and the first via; and an asymmetrical T-structure component having the second via, the asymmetrical T-structure component positioned outside the inverted-F antenna, and the asymmetrical T-structure component disconnected from the inverted-F antenna.

4. The antenna system of claim 3, wherein the inverted-F antenna comprises:

a main part;

a step impedance transformation part connected to the main part, and an end of the step impedance transformation part having the first signal feed point; and a connecting part connected to the main part, and an end of the connecting part has the first via.

5. The antenna system of claim 4, wherein the inverted-F antenna further comprises:

a T-shaped extension part connected to the main part, and the step impedance transformation part positioned between the connecting part and the T-shaped extension part.

6. The antenna system of claim 5, wherein the defective ground structure layer comprises:

a plurality of gaps in a first direction equally spaced from each other; and a plurality of gaps in a second direction equally spaced from each other, the plurality of gaps in the second direction being perpendicular to the plurality of gaps in the first direction, and the at least one antenna body overlapping the plurality of gaps in the first direction and the plurality of gaps in the second direction.

7. The antenna system of claim 6, wherein the plurality of gaps in the first direction at least comprises a first gap in the first direction, a second gap in the first direction and a third gap in the first direction, the T-shaped extension part of the inverted-F antenna is positioned between the first gap in the first direction and the second gap in the first direction, the step impedance transformation part of the inverted-F antenna is positioned on the second gap in the first direction, the connecting part of the inverted-F antenna is positioned on the third gap in the first direction, the plurality of gaps in the second direction at least comprises a first gap in the second direction and a second gap in the second direction, the main part of the inverted-F antenna is positioned on the first gap in the second direction, and the first signal feed point and the first via of the inverted-F antenna and the second via of the asymmetrical T-structure component are positioned on the second gap in the second direction.

8. The antenna system of claim 1, wherein the first antenna body comprises a first inverted-F antenna and a first asymmetrical T-structure component, the first asymmetrical T-structure component is positioned outside the first inverted-F antenna, the first asymmetrical T-structure component is disconnected from the first inverted-F antenna, the second antenna body comprises a second inverted-F antenna and a second asymmetrical T-structure component, the second asymmetrical T-structure component is positioned outside the second inverted-F antenna, and the second asymmetrical T-structure component is disconnected from the second inverted-F antenna.

9. The antenna system of claim 8, wherein the defective ground structure layer comprises:

a first gap in a first direction, a second gap in the first direction, a third gap in the first direction, a fourth gap in the first direction, a fifth gap in the first direction and a sixth gap in the first direction, in order equally spaced; and a first gap in a second direction, a second gap in the second direction, a third gap in the second direction, a fourth gap in the second direction, a fifth gap in the second direction and a sixth gap in the second direction, in order equally spaced, wherein the first to sixth gaps in the second direction are perpendicular to the first to sixth gaps in the first direction, and the first and second inverted-F antennas and the first and second asymmetrical T-structure components overlap the first to sixth gaps in the second direction and the first to sixth gaps in the first direction.

10. The antenna system of claim 9, wherein the first inverted-F antenna comprises a first main part, a first step impedance transformation part, a first connecting part and a first T-shaped extension part, the first The step impedance transformation part, the first connecting part and the first T-shaped extension part are connected to the first main part, an end of the first step impedance transformation part has the first signal feed point, an end of the first connecting part has the first via, the first asymmetrical T-structure component has the second via, the first signal feed point and the first via of the first inverted-F antenna and the second via of the first asymmetrical T-structure component are positioned on the second gap in the second direction.

11. The antenna system of claim 10, wherein the first T-shaped extension part of the first inverted-F antenna is positioned between the first gap in the first direction and the second gap in the first direction, the first step impedance transformation part of the first inverted-F antenna is positioned on the second gap in the first direction, the first connecting part of the first inverted-F antenna is positioned on the third gap in the first direction, and the first main part of the first inverted-F antenna is positioned on the first gap in the second direction.

12. The antenna system of claim 9, wherein the second inverted-F antenna comprises a second main part, a second step impedance transformation part, a second connecting part and a second T-shaped extension part, the second step impedance transformation part, the second connecting part and the second T-shaped extension part are connected to the second main part, an end of the second step impedance transformation part has the second signal feed point, an end of the second connecting part has the third via, the second asymmetrical T-structure component has the fourth via, the second signal feed point and the third via of the second inverted-F antenna and the fourth via of the second asymmetrical T-structure component are positioned on the fifth gap in the second direction.

13. The antenna system of claim 12, wherein the second connecting part of the second inverted-F antenna is positioned on the fourth gap in the first direction, the second step impedance transformation part of the second inverted-F antenna is positioned on the fifth gap in the first direction, the second T-shaped extension part of the second inverted-F antenna is positioned between the fifth gap in the first direction and the sixth gap in the first direction, and the second main part of the second inverted-F antenna is positioned on the sixth gap in the second direction.

14. The antenna system of claim 9, wherein the at least one antenna body further comprises:

a third antenna body having a third signal feed point, a fifth via and a sixth via, the fifth via and the sixth via electrically connected to the ground layer; and a fourth antenna body having a fourth signal feed point, a seventh via and an eighth via, the seventh via and the eighth via electrically connected to the ground layer, and the third antenna body and the fourth antenna body respectively positioned on two diagonal sections of the second insulating plate.

15. The antenna system of claim 14, wherein the third antenna body comprises a third inverted-F antenna and a third asymmetrical T-structure component, the third asymmetrical T-structure component is positioned outside the third inverted-F antenna, the third asymmetrical T-structure component is disconnected from the third inverted-F antenna, the third inverted-F antenna comprises a third main part, a third step impedance transformation part, a third connecting part and a third T-shaped extension part, the third step impedance transformation part, the third connecting part and the third T-shaped extension part are connected to the third main part, an end of the third step impedance transformation part has the third signal feed point, an end of the third connecting part has a fifth via, and the third asymmetrical T-structure component has the sixth via.

16. The antenna system of claim 15, wherein the third main part of the third inverted-F antenna is positioned on the first gap in the first direction, the third T-shaped extension of the third inverted-F antenna is positioned between the fifth gap in the second direction and the sixth gap in the second direction, the third step impedance transformation part of the third inverted-F antenna is positioned on the fifth gap in the second direction, the third connecting part of the third inverted-F antenna is positioned in the fourth gap in the second direction, and the third signal feed point and the fifth via of the third inverted-F antenna and the sixth via of the third asymmetrical T-structure component are positioned in the second gap in the first direction.

17. The antenna system of claim 14, wherein the fourth antenna body comprises a fourth inverted-F antenna and a fourth asymmetrical T-structure component, the fourth asymmetrical T-structure component is positioned outside the fourth inverted-F antenna, the fourth asymmetrical T-structure component is disconnected from the fourth inverted-F antenna, the fourth inverted-F antenna comprises a fourth main part, a fourth step impedance transformation part, a fourth connecting part and a fourth T-shaped extension part, the fourth step impedance transformation part, the fourth connecting part and the fourth T-shaped extension part are connected to the fourth main part, an end of the fourth step impedance transformation part has the fourth signal feed point, an end of the fourth connecting part has the seventh via, and the fourth asymmetrical T-structure component has the eighth via.

18. The antenna system of claim 17, wherein the fourth main part of the fourth inverted-F antenna is positioned on the sixth gap in the first direction, the fourth T-shaped extension part of the fourth inverted-F antenna is positioned between the first gap in the second direction and the second gap in the second direction, the fourth step impedance transformation part of the fourth inverted-F antenna is positioned on the second gap in the second direction, the fourth connecting part of the fourth inverted-F antenna is positioned in the third gap in the second direction, and the fourth signal feed point and the seventh via of the fourth inverted-F antenna and the eighth via of the fourth asymmetrical T-structure component are positioned on the fifth gap in the first direction.

* * * * *